Figure 1:
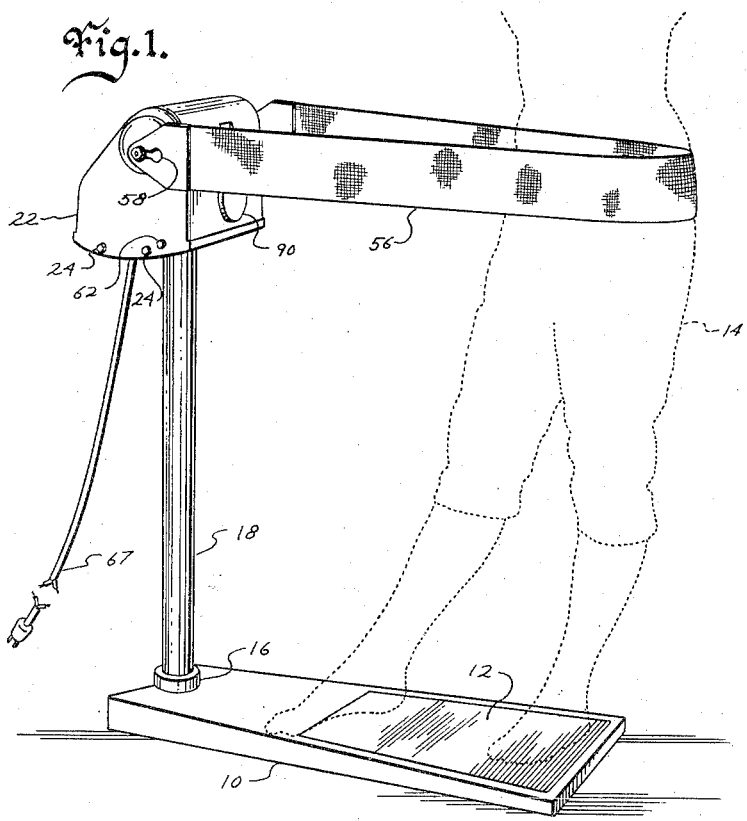

Nov. 18, 1958 L. A. CHRISTENSEN ET AL 2,860,630
VIBRATING MASSAGE MACHINE
Filed March 18, 1957 2 Sheets-Sheet 1

Inventors
Lloyd A. Christensen, Lowell C. Christensen,
William A. Christensen & Weston W. Christensen
by Donald H. Zarley
Attorney Witness
Edward P. Seeley Nov. 18, 1958  L. A. CHRISTENSEN ET AL  2,860,630
VIBRATING MASSAGE MACHINE
Filed March 18, 1957  2 Sheets-Sheet 2

Inventors
Lloyd A. Christensen,
Lowell C. Christensen,
William A. Christensen
& Weston W. Christensen Witness
Edward P. Seeley by Donald H. Zarley
Attorney

United States Patent Office 2,860,630
Patented Nov. 18, 1958

2,860,630

VIBRATING MASSAGE MACHINE

Lloyd A. Christensen, Lowell C. Christensen, William A. Christensen, and Weston W. Christensen, Lohrville, Iowa, assignors to Air Electric Machine Co., Inc., Lohrville, Iowa, a corporation of Iowa Application March 18, 1957, Serial No. 646,602

17 Claims. (Cl. 128—63)

Our invention relates to vibrating massage machines and more particularly to a vibrating massage machine that imparts mechanical impulses to a flexible massaging belt.

Vibrating massage machines have been used for many years for health purposes in aiding the operator to lose weight or to stimulate and exercise the muscles of the body. These machines known to us generally eccentrically secure the ends of a massaging belt to a rotatably powered shaft. The rotating of the shaft results in a constant vibration of the belt and the operator thereupon obtains benefit from the belt by bringing pressure to bear upon the belt by a portion of his body.

One of the greatest shortcomings of most of the vibrating machines known to us is that they are capable of operating at only one speed. This is a great disadvantage in that the same vibration to stimulate the foot is not generally desirable when used upon the neck, for example. The machines that have attempted to provide different degrees of vibration of the belt have done so by supplying a plurality of pulleys of varying sizes or have provided electric motors capable of several fixed speeds. Both of these designs make the machine more expensive to manufacture for additional pulleys or a specially wired motor obviously would add to the fabricating cost. The various pulleys are most unsatisfactory because of the labor involved in changing the power belt from one pulley to another. Furthermore, having several fixed speeds on these machines is not entirely satisfactory for not only do various parts of the body require different degrees of vibration, but people of different stature and physical build require different degrees of vibration upon the same part of the body.

A further disadvantage of the vibrating massage machines known to us is that the stroke or degree of eccentricity of the belt attachments with respect to the power shaft is fixed. If the belt ends are secured very near the center of the power shaft, only a very mild vibration is imparted to the belt, no matter how fast the shaft rotates. This is a very desirable situation under some conditions, but very often a sharper vibration is required. But since the stroke of these machines is fixed, the sharpness or depth of the vibration of the belt cannot be changed from its fixed position.

A further disadvantage of the vibrating massage machines known to us is that the power belts connecting the motor and the power shaft either cannot be tightened after being stretched from use, or the tightening process involves an adjustment in the relative positions of the motor and power shaft.

A still further disadvantage of the vibrating massage machines known to us is that the massage belts connected thereto are subjected to severe wear and have a relatively short life.

Therefore, it is a principal object of our invention to provide a vibrating massage machine that has an infinite number of speeds between certain fixed speed limits.

A further object of our invention is to provide a vibrating massage machine that can be easily changed from one speed to another.

A still further object of our invention is to provide a vibrating massage machine that is capable of having its eccentric stroke adjusted.

A still further object of our invention is to provide a vibrating massage machine that will protect the ends of the massaging belt from stresses imposed thereon by the pulsating, vibrating attachment.

A still further object of our invention is to provide a vibrating massage machine that is economic of manufacture, durable in use and refined in appearance.

These and other objects will be apparent to those skilled in the art.

Figure 2:
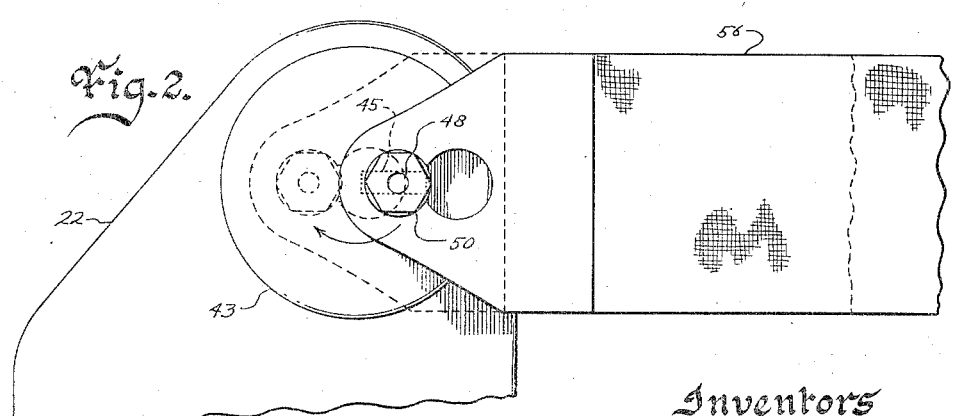

Our invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of our device. The dotted lines in this figure depict the position of a person using our machine, Fig. 2 is a side elevational view of our device showing how the massaging belt is eccentrically secured to the ends of the power shaft, Fig. 3 is a partial sectional view of our device showing the details of our variable size pulley and the stroke adjustment that can be made in relation to the power shaft, and Fig. 4 is a sectional view of our device taken on line 4—4 of Fig. 3 and more fully shows its construction.

I have used the numeral 10 to designate a platform means having a frictional area 12. The numeral 14 in Fig. 1 designates the position of a person standing on platform 10 and using my device. A well 16 is located on one end of platform 10 and is adapted to receive vertical post 18.

A horizontal elongated bracket 20 is secured in any convenient manner to the top of post 18. The ends of bracket 20 are bent vertically and are adapted to receive housing 22. Housing 22 may be secured to bracket 20 in any convenient manner such as by bolts 24.

Figure 3:
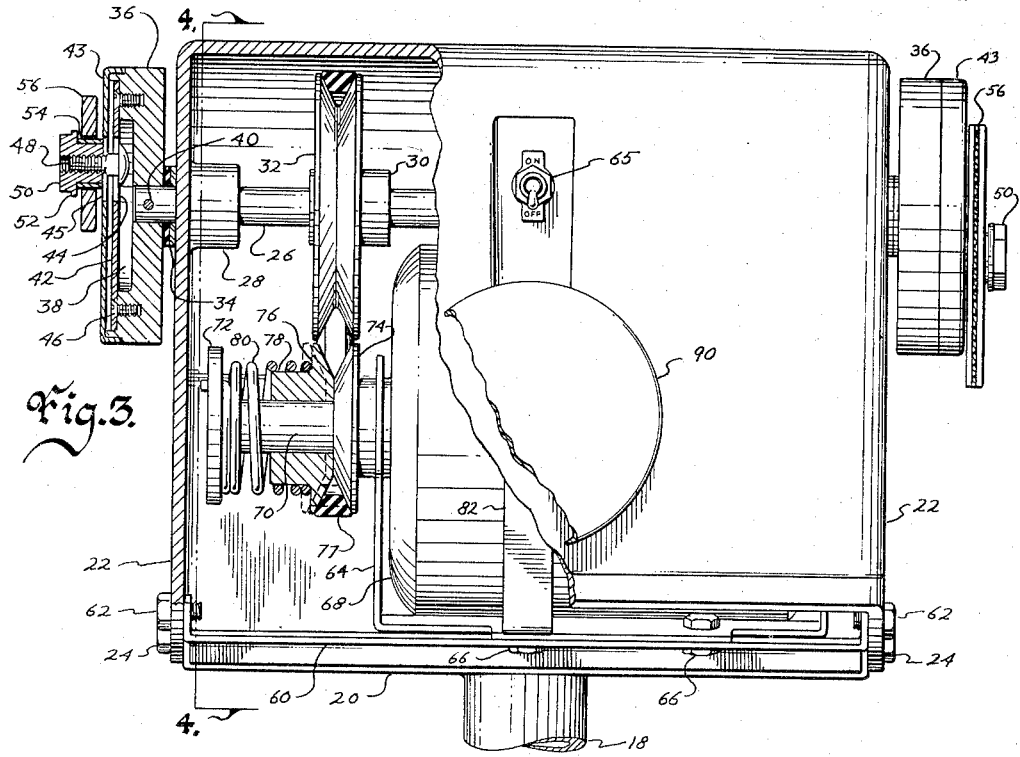
Figure 4:
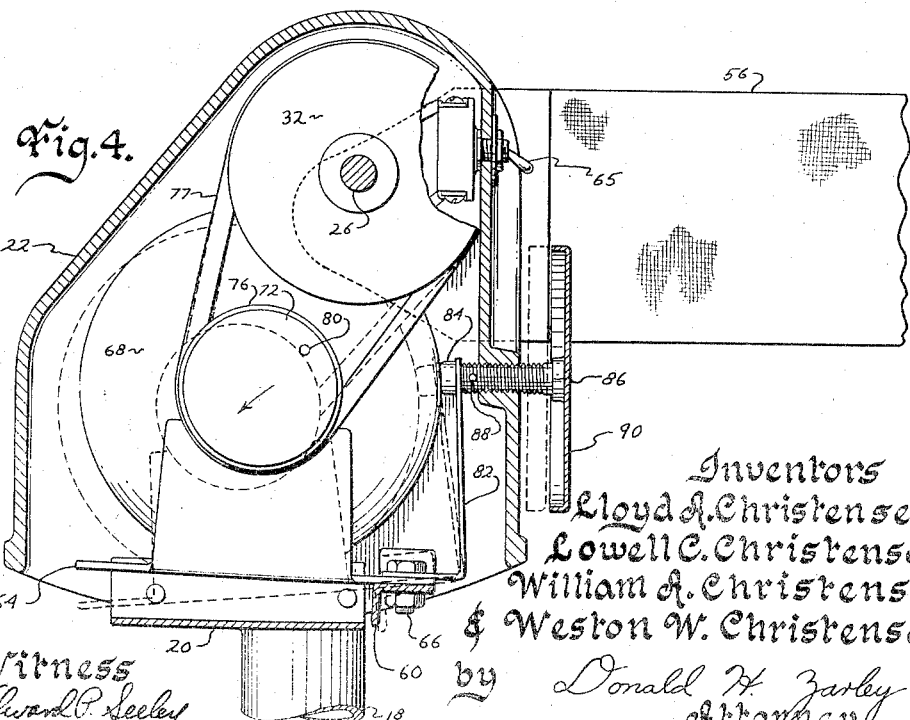

A horizontal shaft 26 is rotatably extending through the upper portion of housing 22, as shown in Figs. 3 and 4. Bearing members 28 embrace the ends of shaft 26 and help to reinforce housing 22 from the mechanical action of shaft 26. A second bearing member 30 is rigidly secured to shaft 26 at a point intermediate of its ends in any convenient manner as by a set screw (not shown). A pulley 32 is rigidly secured in any convenient manner to bearing member 30.

We will describe the assembly at one end of shaft 26, it being assumed that the structure at the other end of the shaft 26 is substantially identical thereto.

A washer 34 embraces the shaft 26 at the point where shaft 26 protrudes from the side of housing 22. Circular disc 36 having an indented portion 38 in its outer face is rigidly secured to the outer end of shaft 26 in any convenient manner such as by pin 40. This structure is clearly shown in Fig. 3. A plate 42 having an elongated slot 44 extending in one direction from the center of the plate is rigidly secured to disc 36 by screws 46. A bolt 48 with its head dwelling within indented portion 38 of disc 36 extends through slot 44 in plate 42 and is slidably movable therein. A cup member 43 with a slot 45 which registers with slot 44 is detachably frictionally secured to the perimeter of disc 36. A bearing member 50 having a hexagon-shaped shoulder 52 is threadably mounted upon the end of bolt 48. A round washer flange 53 separates shoulder 52 from the inner ends of the bearing member 50. The threads of bearing member 50 and bolt 48 are such that the tightened position of member 50 upon the bolt is assumed by rotating member 50 in a direction opposite to the direction of rotation of shaft 26. In actual practice, this results in right and left-handed thread connections between member 50 and bolt 48 on opposite ends of shaft 26. A bushing 54 is rotatably mounted on bearing member 50 and a flexible belt 56 has one of its ends detachably embracing bushing 54 by means of key hole slot 58 in the belt.

An angle member 60 having upturned ends is pivotally secured to the forward bottom portion of housing 22 by bolts 62. A motor mount 64 is secured by its forward side to angle 60 in any convenient manner such as by bolt and nut assemblies 66. A motor 68 is secured to the motor mount in any convenient manner and tends to rotate downward around bolts 62 and angle 60, as shown in Fig. 4. Motor 68 is operatively connected to a source of electric power through switch 65 and wiring 67. The motor drive shaft 70 extends from the motor 68 and terminates in a shoulder portion 72. One half of a conventional pulley 74 is located adjacent motor 68 and is rigidly secured to shaft 70 in any convenient manner such as by a set screw (not shown). A second half of a conventional pulley 76 having a shoulder portion 78 is rotatably and slidably mounted on shaft 70 and is positioned to face pulley half 74. A coil spring 80 which is normally under compression encircles shaft 70 and has one end in pressure engagement with the outside face of pulley half 76. The other end of spring 80 is secured to the shoulder 72 on the end of shaft 70. As shown in Fig. 3, the pulley 32 is in direct vertical alignment with the pulley formed by pulley halves 74 and 76 and V-belt 77 is adapted to connect these aligned elements.

An L-shaped bracket member 82 is secured to angle 60 in any convenient manner as by bolt and nut assembly 66, as shown in Fig. 4. Bracket 82 extends upwardly in front of motor 68 and has a rubber portion 84 on the rear side of its upper end. A horizontal bolt 86 is threadably mounted in the front side of housing 22 and is adapted to engage the front side of the upper end of bracket 82. A pin 88 on the inward end of bolt 86 will serve as a stop means to prevent the inadvertent removal of bolt 86 from housing 22. A circular dial 90 is rigidly secured to the outer end of bolt 86.

The normal operation of my device is as follows: The stroke of the machine can be adjusted by loosening bearing members 50 from bolts 48 and changing the position of members 50 with respect to shaft 26 by sliding bolts 48 away or towards shaft 26 within the registering slots 44 and 45. As shown in Fig. 3, the bearing members 50 at opposite ends of shaft 26 are 180 degrees out of phase with each other. The belt 56 is inserted upon bearing members 50 after these members have been positioned and tightened.

The motor 68 can then be energized by closing switch 65 and shaft 26 is thereby rotated through the conventional action of the pulley 32, belt 77 and pulley halves 74 and 76. Tension is always brought upon belt 77 because motor 68 is always attempting to rotate downward as shown in Fig. 4.

With the weight of the motor "hanging" on belt 77, as shown by the solid lines in Fig. 4, the shaft 26 is rotating at its fastest speed. If it is then desired to decrease the speed of rotation of shaft 26, dial 90 is rotated to screw bolt 86 inward to engage bracket 82 which in turn forceably rotates motor 68 downward, as shown by the dotted lines in Fig. 4. This causes the motor shaft 70 to move away from the axis of shaft 26. The tension of belt 77 on pulley 32 and pulley halves 74 and 76 thereby increases and belt 77 begins to spread the pulley halves apart (as shown by the dotted lines in Fig. 3) and to compress spring 80 as pulley half 76 moves toward the end of shaft 70. As the pulley halves 74 and 76 are spread apart, belt 77 draws closer to the center of shaft 70 thereby reducing the effective size of the pulley formed by the two halves. Obviously, the speed of rotation of shaft 26 will then be decreased. Since motor 68 can be rotated to any amount within certain fixed limits by dial 90, an infinite number of "pulley sizes" created by pulley halves 74 and 76 is made possible. This, of course, results in an infinite number of possible speeds for shaft 26.

If it is then desired to once again increase the speed of rotation of shaft 26, the bolt 86 is withdrawn from operative engagement with motor 68 by dial 90 and the combined action of compressed spring 80 attempting to force pulley halves 74 and 76 back together with the rotatable action of both the pulley halves and the belt 77 will lift the motor back to its initial position shown by the solid lines in Fig. 4. This will obviously leave the pulley halves 74 and 76 in closer relation and increase the effective size of the resulting pulley to increase the speed of rotation of shaft 26. It is also seen that the natural tendency of the motor 68 to rotate away from shaft 26 will always automatically compensate for any stretching of belt 77. Bushings 54 on bearing members 50 protect the belt 56 from both the impact and rotation of the bearing members.

From the foregoing, it may be seen that our invention accomplishes at least all its stated objectives.

Some changes may be made in the construction and arrangement of our vibrating massage machine without departing from the real spirit and purpose of our invention, and it is our intention to cover by our claims, any modified forms of structure or use of mechanical equivalents which may be reasonably included within their scope.

We claim:

1. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, a flexible belt having its respective ends secured to said bearing members and engaging said friction-reducing means, a motor eccentrically pivotally mounted in said housing, a drive shaft extending from said motor, an expandable pulley on said drive shaft, means on said expandable pulley yieldingly holding said expandable pulley against expansion, a continuous belt connecting said first pulley and said expandable pulley and adapted to resist the gravitational pivoting of said motor with respect to said housing, and means on said housing for selectively pivoting said motor.

2. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, a flexible belt having its respective ends secured to said bearing members and engaging said friction-reducing means, a motor eccentrically pivotally mounted in said housing, a drive shaft extending from said motor, a second pulley on said drive shaft, a continuous belt connecting said first and second pulleys and adapted to resist the gravitational pivoting of said motor with respect to said housing, means operatively secured to said housing for selectively pivoting said motor to increase the tension on said belt, and means on said second pulley for yieldingly allowing the increased tension on said belt to decrease the effective size of said second pulley.

3. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, said bearing members on said shaft being out of phase with each other, a flexible belt having its respective ends secured to said bearing members and engaging said friction-reducing means, a motor eccentrically pivotally mounted in said housing, a drive shaft extending from said motor, a second pulley on said drive shaft, a continuous belt connecting said first and second pulleys and adapted to resist the gravitational pivoting of said motor with respect to said housing.

4. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, said bearing members on said shaft being out of phase with each other, a flexible belt having its respective ends secured to said bearing members and engaging said friction-reducing means, a motor pivotally eccentrically mounted in said housing, a drive shaft extending from said motor, a second pulley on said drive shaft, a continuous belt connecting said first and second pulleys and adapted to resist the gravitational pivoting of said motor with respect to said housing, means operatively secured to said housing for selectively pivoting said motor to increase the tension on said belt, and means on said second pulley for yieldingly allowing the increased tension on said belt to decrease the effective size of said second pulley.

5. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, said bearing members on said shaft being out of phase with each other, means on said shaft for adjusting the eccentricity of said bearing members, a flexible belt having its respective ends secured to said bearing members and engaging said friction-reducing means, a motor eccentrically pivotally mounted in said housing, a drive shaft extending from said motor, a second pulley on said drive shaft, a continuous belt connecting said first and second pulleys and adapted to resist the gravitational pivoting of said motor with respect to said housing.

6. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, said bearing members on said shaft being out of phase with each other, means on said shaft for adjusting the eccentricity of said bearing members, a flexible belt having its respective ends secured to said bearing members and engaging said friction-reducing means, a motor eccentrically pivotally mounted in said housing, a drive shaft extending from said motor, a second pulley on said drive shaft, a continuous belt connecting said first and second pulleys and adapted to resist the gravitational pivoting of said motor with respect to said housing, means operatively secured to said housing for selectively pivoting said motor to increase the tension on said belt, and means on said second pulley for yieldingly allowing the increased tension on said belt to decrease the effective size of said second pulley.

7. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, a flexible belt having its respective ends secured to said bearing members and engaging said friction-reducing means, a motor pivotally mounted in said housing, a drive shaft extending from said motor, an expandable pulley on said drive shaft, means on said expandable pulley yieldingly holding said expandable pulley against expansion, a continuous belt connecting said first pulley and said expandable pulley and adapted to resist the gravitational pivoting of said motor with respect to said housing, and means on said housing for selectively pivoting said motor.

8. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, a flexible belt having its respective ends secured to said bearing members and engaging said friction-reducing means, a motor pivotally mounted in said housing, a drive shaft extending from said motor, a second pulley on said drive shaft, a continuous belt connecting said first and second pulleys and adapted to resist the gravitational pivoting of said motor with respect to said housing, means operatively secured to said housing for selectively pivoting said motor to increase the tension on said belt, and means on said second pulley for yieldingly allowing the increased tension on said belt to decrease the effective size of said second pulley.

9. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, said bearing members on said shaft being out of phase with each other, a flexible belt having its respective ends secured to said bearing members and engaging said friction-reducing means, a motor pivotally mounted in said housing, a drive shaft extending from said motor, a second pulley on said drive shaft, a continuous belt connecting said first and second pulleys and adapted to resist the gravitational pivoting of said motor with respect to said housing.

10. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, said bearing members on said shaft being out of phase with each other, a flexible belt having its respective ends secured to said bearing members and engaging said friction-reducing means, a motor pivotally mounted in said housing, a drive shaft extending from said motor, a second pulley on said drive shaft, a continuous belt connecting said first and second pulleys and adapted to resist the gravitational pivoting of said motor with respect to said housing, means operatively secured to said housing for selectively pivoting said motor to increase the tension on said belt, and means on said second pulley for yieldingly allowing the increased tension on said belt to decrease the effective size of said second pulley.

11. In a vibrating machine capable of operating at an infinite number of speeds, a supporting means, a housing on said supporting means, a shaft rotatably supporting by said housing, a first pulley on said shaft, a separate bearing member operatively independently eccentrically secured to each end of said shaft, a friction-reducing means on each of said bearing members, said bearing members on said shaft being out of phase with each other, means on said shaft for adjusting the eccentricity of said bearing members, a flexible belt having its respective ends secured to said bearing members and engaging said friction-reducing means, a motor pivotally mounted in said housing, a drive shaft extending from said motor, a second pulley on said drive shaft, a continuous belt connecting said first and second pulleys and adapted to resist the gravitational pivoting of said motor with respect to said housing.

12. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, said bearing members on said shaft being out of phase with each other, means on said shaft for adjusting the eccentricity of said bearing members, a flexible belt having its respective ends secured to said bearing members and engaging said friction-reducing means, a motor pivotally mounted in said housing, a drive shaft extending from said motor, a second pulley on said drive shaft, a continuous belt connecting said first and second pulleys and adapted to resist the gravitational pivoting of said motor with respect to said housing, means operatively secured to said housing for selectively pivoting said motor to increase the tension on said belt, and means on said second pulley for yieldingly allowing the increased tension on said belt to decrease the effective size of said second pulley.

13. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, a flexible belt having its respective ends secured to said bearing members and engaging said friction-reducing means, a motor eccentrically pivotally mounted in said housing, a drive shaft extending from said motor, a second pulley on said drive shaft, a continuous belt connecting said first and second pulleys and adapted to resist the gravitational pivoting of said motor with respect to said housing, a bolt means operatively secured to said housing for selectively pivoting said motor to increase the tension on said belt, and a spring means on said second pulley for yieldingly allowing the increased tension on said belt to decrease the effective size of said second pulley; said spring means being of sufficient strength to increase the effective size of said second pulley whenever said bolt means is withdrawn from pivoting said motor.

14. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, a flexible belt having its respective ends secured to said bearing members and engaging said friction-reducing means, a motor pivotally mounted in said housing, a drive shaft extending from said motor, an expandable pulley on said drive shaft, means on said expandable pulley yieldingly holding said expandable pulley against expansion, a continuous belt connecting said first and second pulleys and adapted to resist the gravitational pivoting of said motor with respect to said housing, and means on at least said first or second pulley for yieldingly allowing the increased tension on said belt to change the effective size of the pulley upon which it is mounted.

15. In a vibrating machine capable of operating at an infinite number of speeds, a supporting means, a housing on said supporting means, a shaft rotatably supported by said housing, a first pulley on said shaft, a separate bearing member operatively independently eccentrically secured to each end of said shaft, a friction-reducing means on each of said bearing members, a flexible belt having its respective ends secured to said bearing members and engaging said friction-reducing means, a motor pivotally mounted in said housing, a drive shaft extending from said motor, a second pulley on said drive shaft, a continuous belt connecting said first and second pulleys and adapted to resist the pivoting of said motor with respect to said housing, means operatively secured to said housing for selectively pivoting said motor to increase the tension on said belt, and means on said second pulley for yieldingly allowing the increased tension on said belt to change the effective size of said second pulley.

16. A vibrating machine capable of operating at an infinite number of speeds, said machine comprising a platform for supporting a person to be operated upon, a post member extending vertically upward from said platform, a housing mounted on said post member, a power shaft rotatably mounted within said housing, annular members coupled to said power shaft, eccentric coupling means cooperating with each of said annular members, said eccentric coupling means being out of phase with one another, a friction-reducing means on each of said eccentric coupling means, a flexible belt having ends coupled to said eccentric coupling means and engaging said friction-reducing means, a first pulley mounted on said power shaft, a motor pivotally mounted for arcuate movement within said housing, said motor having a drive shaft, an expandible pulley means mounted on said drive shaft, belt means connecting said pulleys to one another, said belt means being maintained in tension by at least part of the weight of said motor, and adjustment means engaging said motor whereby said motor may be pivoted to adjust the tension on said belt means and thereby change the speed of said power shaft, said adjustment means having a dial on the exterior of said housing.

17. A vibrating machine capable of operating at an infinite number of speeds, said machine comprising a platform for supporting a person to be operated upon, a post member extending vertically upward from said platform, a housing mounted on said post member, a power shaft rotatably mounted within said housing, annular members coupled to said power shaft, eccentric coupling means cooperating with each of said annular members, said eccentric coupling means being out of phase with one another, a friction-reducing means on each of said eccentric coupling means, a flexible belt having ends coupled to said eccentric coupling means and engaging said friction-reducing means, a first pulley mounted on said power shaft, a motor pivotally mounted for arcuate movement within said housing, said motor having a drive shaft, an expandible pulley means mounted on said drive shaft, belt means connecting said pulleys to one another, said belt means being maintained in tension by at least part of the weight of said motor, and adjustment means engaging said motor whereby said motor may be pivoted to adjust the tension on said belt means and thereby change the speed of said power shaft.

References Cited in the file of this patent

UNITED STATES PATENTS

| Re. 22,085 | Reeves | Apr. 28, 1942 |
| 1,760,578 | Blomquist | May 27, 1930 |
| 1,769,565 | Goodrich | July 1, 1930 |
| 1,845,298 | Lee | Feb. 16, 1932 |
| 1,849,706 | Chadwick | Mar. 15, 1932 |
| 1,969,247 | Wolcott | Aug. 7, 1934 |